United States Patent
Scheel et al.

(10) Patent No.: US 7,856,680 B2
(45) Date of Patent: Dec. 28, 2010

(54) SHOWER DRAINAGE OUTLET IN AIRCRAFT

(75) Inventors: Marc Scheel, Hamburg (DE); Simone Guttau, Buxtehude (DE); Gunnar Heuer, Horneburg (DE)

(73) Assignee: Airbus Deutschland GmbH (DE)

( * ) Notice: Subject to any disclaimer, the term of this patent is extended or adjusted under 35 U.S.C. 154(b) by 761 days.

(21) Appl. No.: 11/699,222

(22) Filed: Jan. 29, 2007

(65) Prior Publication Data

US 2007/0204397 A1    Sep. 6, 2007

Related U.S. Application Data

(60) Provisional application No. 60/763,441, filed on Jan. 30, 2006.

(30) Foreign Application Priority Data

Jan. 30, 2006   (DE)   ............... 10 2006 004 225

(51) Int. Cl.
  *A47K 3/022*   (2006.01)
  *E03C 1/26*   (2006.01)
(52) U.S. Cl. .................. 4/613; 4/650; 4/288; 4/292; 4/DIG. 14
(58) Field of Classification Search .............. 4/640, 4/650, 652, 286–288, 292, DIG. 14, 613
See application file for complete search history.

(56) References Cited

U.S. PATENT DOCUMENTS

| | | | | |
|---|---|---|---|---|
| 2,739,317 A | * | 3/1956 | Abresch ................... | 4/679 |
| 3,509,587 A | * | 5/1970 | Fins ........................ | 4/288 |
| 3,670,894 A | * | 6/1972 | Friedl ...................... | 210/164 |
| 3,881,201 A | * | 5/1975 | Richards .................. | 4/286 |
| 4,067,072 A | * | 1/1978 | Izzi ......................... | 4/288 |
| 4,325,405 A | * | 4/1982 | Christo .................... | 137/371 |
| 4,419,231 A | * | 12/1983 | Friedl ...................... | 210/164 |
| 4,571,751 A | * | 2/1986 | Barlow .................... | 4/288 |
| 5,083,727 A | | 1/1992 | Pompei et al. | |
| 5,165,118 A | * | 11/1992 | Cendrowski ............. | 4/287 |
| 5,353,448 A | | 10/1994 | Lee | |
| 5,418,983 A | * | 5/1995 | Garguillo et al. ........ | 4/287 |
| 5,745,931 A | * | 5/1998 | Ball ......................... | 4/286 |
| 6,023,795 A | | 2/2000 | Potter et al. | |
| 7,503,083 B2 | * | 3/2009 | Ball ......................... | 4/650 |

FOREIGN PATENT DOCUMENTS

| | | |
|---|---|---|
| DE | 297 18 456 U1 | 2/1998 |
| EP | 1 167 643 | 1/2002 |
| WO | WO-2006/062392 A1 | 6/2006 |

* cited by examiner

*Primary Examiner*—Khoa D Huynh
(74) *Attorney, Agent, or Firm*—Lerner, David, Littenberg, Krumholz & Mentlik, LLP

(57) ABSTRACT

A shower drainage outlet for a shower tub in an aircraft is stated, which shower drainage outlet comprises three parts that can be displaced, angled or rotated in relation to one another. In this way horizontal, vertical and angular tolerances can be compensated for. Furthermore, the shower drainage outlet is designed to be inserted through an opening in the floor region of the aircraft.

12 Claims, 1 Drawing Sheet

SHOWER DRAINAGE OUTLET IN AIRCRAFT

CROSS-REFERENCE TO RELATED APPLICATIONS

This application claims the benefit of the filing date of German Patent Application No. 10 2006 004 225.5 filed Jan. 30, 2006 and of U.S. Provisional Patent Application No. 60/763,441 filed Jan. 30, 2006, the disclosures of which are hereby incorporated herein by reference.

FIELD OF THE INVENTION

The present invention relates to shower drainage outlets for aircraft. In particular, the present invention relates to a shower drainage outlet for a shower tub in an aircraft, to a waste water system for an aircraft, as well as to the use of a corresponding shower drainage outlet in an aircraft.

TECHNOLOGICAL BACKGROUND OF THE INVENTION

In aircraft, waste water systems are used to collect or discharge to the outside the waste water from wash basins or sinks, as well as the water from galleys. Up to now the wash basins, the drainage outlets from galleys, as well as the air humidifiers of the air conditioning system have been connected to the waste water system of the aircraft. The waste water system collects the water from hand basins or wash basins as well as the water from the galleys and leads this water to a drain mast by means of which the waste water is discharged to the outside in a targeted manner.

In addition to the wash basins and drains of the galleys, showers may be connected to the waste water system in passenger aircraft, wherein said showers are connected to the downstream pipes of the waste water system by way of a corresponding shower drainage outlet.

If the discharge container (wash basin or shower tub) is connected to the pipe work (waste water system) by way of a shower drainage outflow, horizontal, vertical and angular tolerances between the components to be connected may result in stress in the connection elements, which stress may result in mechanical destruction or increased leakage.

SUMMARY OF THE INVENTION

According to an exemplary embodiment of the present invention a shower drainage outlet for a shower tub in an aircraft is stated, the shower drainage outlet comprising a housing with a first part, a second part and a third part, wherein the first part is designed to be inserted into an opening in the shower tub, wherein the second part is designed for connecting the first part to the third part, and wherein the third part is designed to be connected to a waste water pipe.

In this way a shower drainage outlet is stated which apart from a connection to the discharge container (in this case the shower tub) with the pipe work at the same time also includes a watertight hole through a single-part or multi-part floor layer. Furthermore, the three-part design of the shower drainage outflow may result in the ability to compensate for horizontal, vertical and angular tolerances between the components to be connected. This can, for example, be achieved in that the parts are slidable, rotatable, or tiltable, in relation to each other, without this leading to a reduction in the sealing integrity between the individual components.

According to a further exemplary embodiment of the present invention, the first part comprises a bearing region for resting against the top of the shower tub in a waterproof manner.

In this way, during installation of the shower drainage outlet, the first part may be inserted from above into the opening of the shower tub until the bearing region rests against the top of the shower tub. In this way an area-shaped tight connection between the bearing region of the first part of the shower drainage outlet and the shower tub may be provided. In this arrangement the first part may be displaced relative to the shower tub without this reducing the sealing integrity.

According to a further exemplary embodiment of the present invention, the second part comprises a floor adapter to be attached to the floor of a shower cabin or to the floor of an aircraft cabin.

The floor adapter can, for example, be a floor adapter according to ABS1126 (as shown in FIG. 1, reference character 6); however, other floor adapters may also be used.

According to a further exemplary embodiment of the present invention, the floor adapter is designed to be bonded or screwed to the floor of the shower cabin or to the floor of the aircraft cabin so that a waterproof seal between the floor and the floor adapter results.

In this way a fixed permanent connection between the floor of the shower cabin or if applicable the floor of the aircraft cabin may be provided.

According to a further exemplary embodiment of the present invention, an overlap between the bearing region and the top of the shower tub is provided so that displacement between the bearing region and the top of the shower tub may not result in a reduction in the sealing integrity between these two elements, wherein as a result of this overlap horizontal tolerances between the shower tub and the waste water pipe may be compensated for.

The middle (second) part of the shower drainage outlet is firmly connected to one of the floor elements or to the only floor element. This connection can comprise a screw connection, if applicable with additional bonding, mere bonding, or, for example, also squeezing in combination with bonding (or other attachment means). For example a connection using pins or rivets may also be provided.

According to a further exemplary embodiment of the present invention, the first part is designed to be inserted into the second part so that a sliding connection between these two parts arises, as a result of which connection it is possible to compensate for any angular tolerances or vertical tolerances between the shower tub and the floor of the shower cabin or the floor of the aircraft cabin (depending on which one of the two floors applies).

Furthermore, according to another exemplary embodiment of the present invention a first sealing element is provided which is designed to seal the sliding connection between the first part and the second part.

This sealing element is, for example, a sealing layer of a partial region of the first part and/or of the second part, or a sealing ring or o-ring. Other sealing elements or additional sealing elements may also be used.

According to a further exemplary embodiment of the present invention, the drainage outlet further comprises a coupling element for connecting the second part to the third part, wherein the coupling element is designed to compensate for tolerances between the floor of the shower cabin or the floor of the aircraft cabin and the waste water pipe.

According to a further exemplary embodiment of the present invention, the coupling element is a coupling element that connects two pipes in that both pipe ends comprise a flange with a groove in which an o-ring provides a seal in relation to a sleeve into which again both flanges are inserted. The sleeve is kept in position by a clamp (see FIG. 1, coupling around seal 9). The standards ABS0395 and SAE-AS1650 are examples of this type of coupling.

According to a further exemplary embodiment of the present invention, the shower drainage outlet further comprises a filter within the housing to protect the waste water pipe from dirt as a result of coarse impurities contained in the shower water.

Furthermore, a second sealing element between the filter and the first part may be provided to ensure a flow through the filter from the inside to the outside.

The filter may, for example, comprise a mesh width of 2 mm and a filter area of 0.012 to 0.016 m². Of course, the filter may also have a larger or a smaller filter area, depending on the required through-flow quantity. Moreover, the mesh width may be selected so as to be larger or smaller, depending on the type of filter effect that is to be achieved.

According to a further exemplary embodiment, third sealing elements are provided which are designed to seal the combination of coupling element/second part/third part. These elements may be o-rings or some other sealing elements.

According to a further exemplary embodiment of the present invention, the shower drainage outlet is designed such that a single or double or treble floor structure can be used. In this arrangement the thickness of the floor structure is immaterial because the first part can be slid into the second part from above, and the slide-in length can be varied accordingly. In this way vertical tolerances are compensated for, and floors of different thickness can be used.

According to a further exemplary embodiment of the present invention, a waste water system for an aircraft is stated, with the waste water system comprising a shower drainage outlet as described above and a waste water pipe, wherein the shower drainage outlet is designed to connect the waste water pipe to a shower tub through a floor structure while compensating for vertical and angular tolerances.

In this way a complete waste water system for an aircraft may be provided, which may be connected to any type of shower tub through multi-layer or single-layer floor structures of any thickness. Furthermore, the waste water system according to the invention may be characterised by increased mechanical flexibility, which may make it possible for said waste water system to compensate for both vertical and horizontal tolerances. These tolerances can, for example, occur during flight, since in this phase enormous differences in pressure or temperature may occur, as a result of which differences the geometry of the fuselage changes.

Furthermore, the use of a corresponding shower drainage outlet in an aircraft is stated.

Below, with reference to the FIGURE, preferred exemplary embodiments of the present invention are described.

DETAILED DESCRIPTION OF EXEMPLARY EMBODIMENTS

Figure 1:
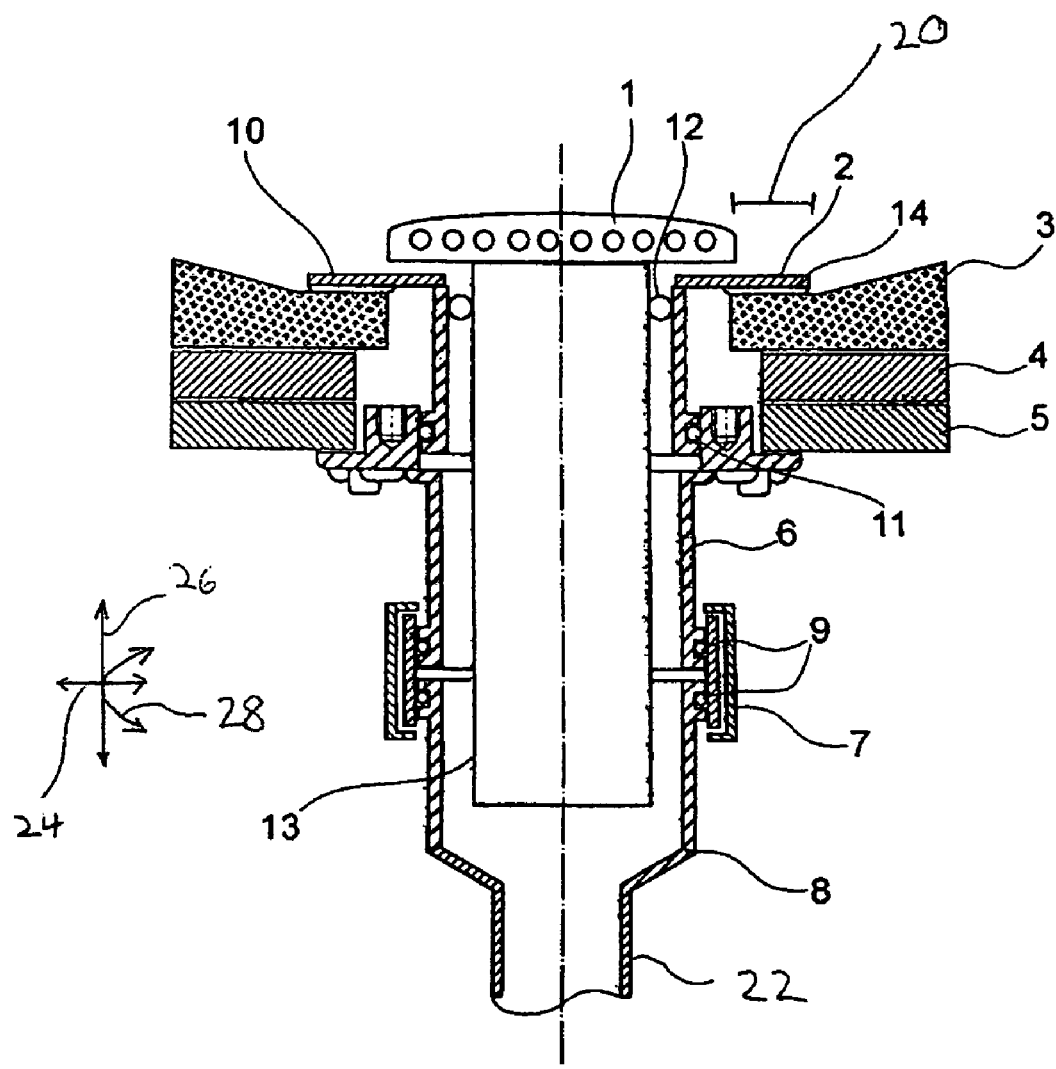
FIG. 1 shows a diagrammatic cross-sectional view of a shower drainage outlet according to an exemplary embodiment of the present invention.

In the following description of the FIGURE the same reference characters are used for identical or similar elements.

The drawings are diagrammatic. They are not suitable for showing dimensions or proportions.

As shown in FIG. 1, the shower drainage outlet comprises a first part 2, a second part 6 and a third part 8. In this arrangement the first part 2 (shower tub outflow) can be slid from above into an opening in the shower tub 3. In this arrangement the bearing region (surface) 10 of the first part 2 comes to rest against the top of the shower tub 3. As a result of an overlap 20 between the bearing region 10 and the top of the shower tub 3, horizontal tolerances may be compensated for, without this leading to a loss of the sealing integrity in the region of the bearing region 10.

In order to enhance the sealing integrity, a sealing element 14 may be provided, which is, for example, designed in the form of a coating, film, sealing mat, o-ring or the like.

The first part 2 with the bearing region 10 may thus be slid against the shower tub 3.

Apart from the connection from the discharge container (in this case the shower tub 3) to a pipe work 22, the shower drainage outflow also comprises a waterproof hole through a single-part or multi-part floor layer 4, 5. Furthermore, said shower drainage outflow provides the option of compensating for horizontal tolerances 24, vertical tolerances 26, and angular tolerances 28 between the components to be connected.

Thus, a connection between the shower (or hand basin, sink unit or the like) to the waste water system, whose pipe work extends underneath the cabin floor, may be provided.

The outflow comprises a three-part housing 2, 6, 8, which is to compensate for the tolerances that occur on the one hand between the shower tub 3 and the cabin floor 5, and on the other hand between the cabin floor 5 and the pipe work 22 connected underneath it.

The floor adapter 6 (second part) is designed for attachment to the shower cabin floor 4 or (if present) to the aircraft cabin floor 5. The shower tub outflow 2 (first part) is slid from above into the floor adapter 6 so as to provide a tight seal.

Horizontal tolerances 24, which may occur between the upper part of the shower drainage outlet 2 and the shower tub 3, may be compensated for by the horizontal contact plane and the use of a sealant. For example, an overlap 20 is provided that is large enough to compensate for displacements.

Vertical tolerances 26 or angular tolerances 28 between the shower tub and the cabin floor may be compensated for by the upper part of the shower drainage outflow 2 in that the upper shower drainage outflow 2 is inserted into the lower shower drainage outflow 6 and is sealed by means of an o-ring 11 as the seal.

Furthermore, the housing of the shower drainage outflow accommodates an outflow plug 1 with a filter or a sieve 13. The filter is sealed off from the upper part 2 of the shower drainage outflow by means of a seal, which may ensure that there is a through-flow through the filter from the inside to the outside.

The coupling elements 7 (which may, for example, be the coupling element according to ABS0395) join the housing components 6 and 8 together with the use of corresponding seals 9.

Further seals are in position between the upper part of the shower drainage outlet 2 and the shower tub 3, between the filter 13 and the upper part of the shower drainage outlet 2, as well as between the upper part of the shower drainage outlet 2 and the lower part of the shower drainage outlet 6.

The design of the shower drainage outflow may also be possible with the use of an additional floor that forms part of the shower housing. The shower drainage outflow may also be used in other vehicles, such as a bus or rail vehicle.

In addition, it should be pointed out that "comprising" does not exclude other elements or steps, and "a" or "one" does not exclude a plural number. Furthermore, it should be pointed out that characteristic features or steps which have been described with reference to one of the above exemplary embodiments can also be used in combination with other characteristic features or steps of other exemplary embodiments described above. Reference characters in the claims are not to be interpreted as limitations.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A shower drainage outlet for a shower tub in an aircraft, the shower drainage outlet comprising a housing with:
    a first part having a bearing region;
    a second part; and
    a third part;
    wherein the first part is designed to be inserted into an opening in the shower tub;
    wherein the second part is designed for connecting the first part to the third part;
    wherein the third part is designed to be connected to a waste water pipe;
    wherein an overlap between the bearing region and the top of the shower tub is provided after final installation of the drainage outlet so that displacement between the bearing region and the top of the shower tub during flight does not result in a reduction in a sealing integrity between these two elements;
    wherein as a result of this overlap horizontal tolerances between the shower tub and the waste water pipe can be compensated for; and
    wherein the first part is designed to be inserted into the second part so that a sliding connection is provided after final installation of the drainage outlet, which connection is adapted for compensation of any angular or vertical tolerances between the shower tub and the floor of the shower cabin or the floor of the aircraft cabin during flight.

2. The shower drainage outlet of claim 1,
    wherein the bearing region rests against the top of the shower tub in a waterproof manner.

3. The shower drainage outlet of claim 1,
    wherein the second part comprises a floor adapter for attachment to the floor of a shower cabin or to the floor of an aircraft cabin.

4. The shower drainage outlet of claim 1,
    wherein the floor adaptor is designed to be at least one of bonded, screwed, and squeezed to at least one of the floor of the shower cabin and to the floor of the aircraft cabin so that a waterproof seal between the floor and the floor adapter results.

5. The shower drainage outlet of claim 1, further comprising:
    a first sealing element for sealing the sliding connection between the first part and the second part.

6. The shower drainage outlet of claim 1, further comprising:
    a coupling element for connecting the second part to the third part;
    wherein the coupling element is designed to compensate for tolerances between the floor of the shower cabin or the floor of the aircraft cabin and the waste water pipe.

7. The shower drainage outlet of claim 6,
    wherein the coupling element is a coupling element according to SAE-AS1650.

8. The shower drainage outlet of claim 1, further comprising:
    a filter within the housing to protect the waste water pipe from dirt as a result of coarse impurities contained in the shower water.

9. The shower drainage outlet of claim 8, further comprising:
    a second sealing element between the filter and the first part to ensure a flow through the filter from the inside to the outside;
    wherein the filter comprises a mesh width of 2 mm and a filter area of 0.012 to 0.016 $m^2$.

10. A waste water system for an aircraft, with the waste water system comprising:
    a shower drainage outlet of claim 1; and
    a waste water pipe;
    wherein the shower drainage outlet is designed to connect the waste water pipe to a shower tub through a floor structure while compensating for vertical and angular tolerances.

11. The shower drainage outlet of claim 1, wherein during flight the first part is slidable relative to the top of the shower tub so as to maintain the overlap during flight operation.

12. The shower drainage outlet of claim 1, wherein the bearing region of the first part comprises a seal.

* * * * *